(12) United States Patent
Tanaka et al.

(10) Patent No.: US 7,045,202 B2
(45) Date of Patent: May 16, 2006

(54) LONG GLASS FIBER FILLER REINFORCED RESIN MATERIAL FOR MOLDING, METHOD FOR MOLDING MOLDED ARTICLE, AND MOLDED ARTICLE MOLDED BY THE METHOD

(75) Inventors: Chikara Tanaka, Hiroshima (JP); Takahiro Tochioka, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 48 days.

(21) Appl. No.: 10/352,113

(22) Filed: Jan. 28, 2003

(65) Prior Publication Data

US 2003/0148083 A1 Aug. 7, 2003

(30) Foreign Application Priority Data

Jan. 30, 2002 (JP) ........................... 2002-021312

(51) Int. Cl.
*B32B 27/12* (2006.01)

(52) U.S. Cl. ................ 428/297.4; 428/137; 428/220; 428/322; 428/372; 428/402; 264/478; 264/430; 264/500; 264/519; 264/531; 264/172.13; 523/351; 524/494; 524/493

(58) Field of Classification Search ............... 428/137, 428/220, 322, 372, 402, 297.4, 31, 614, 212, 428/219; 264/478, 430, 500, 519, 531, 172.13; 523/351, 348; 524/494, 493
See application file for complete search history.

(56) References Cited

U.S. PATENT DOCUMENTS

| 4,514,745 | A | | 4/1985 | Suzuki et al. |
| 4,735,988 | A | * | 4/1988 | Takada et al. ............ 524/504 |
| 4,997,875 | A | * | 3/1991 | Geddes et al. ............ 524/504 |
| 5,484,835 | A | | 1/1996 | Sobajima et al. |
| 5,514,745 | A | * | 5/1996 | Yoshino .................. 524/494 |
| 6,447,875 | B1 | * | 9/2002 | Norquist et al. .......... 428/107 |

FOREIGN PATENT DOCUMENTS

| EP | 0 875 351 A1 | 11/1998 |
| EP | 1 236 771 A1 | 9/2002 |
| JP | 03-25340 | 4/1991 |
| JP | 5-124036 | 5/1993 |
| JP | 06-340784 | 12/1994 |
| JP | 07-232324 | 9/1995 |
| JP | 2721702 | 11/1997 |
| JP | 10-176085 | 6/1998 |
| JP | 11-152062 | 6/1999 |
| JP | 11-228759 | 8/1999 |
| JP | 2001-316534 | 11/2001 |
| WO | WO 01/72511 | 10/2001 |

OTHER PUBLICATIONS

European Search Report (Dated May 8, 2003).

* cited by examiner

*Primary Examiner*—Merrick Dixon
(74) *Attorney, Agent, or Firm*—Nixon Peabody LLP; Donald R. Studebaker

(57) ABSTRACT

A long glass fiber filler reinforced resin material for molding includes a masterbatch formed of a composite of a matrix resin with a polypropylene (PP) component and a long glass fiber filler and a diluent resin made from an ethylene-propylene block copolymer. The above-described matrix resin of the masterbatch includes the PP component having a pentad isotactic index of at least 95%, and a melt flow rate (MFR) of the matrix resin of the masterbatch is 100 to 500 g/10 min and larger than six times a melt flow rate of the diluent resin. The long glass fiber filler is in a content of 30 to 50 mass percent with respect to a total mass thereof.

5 Claims, 6 Drawing Sheets

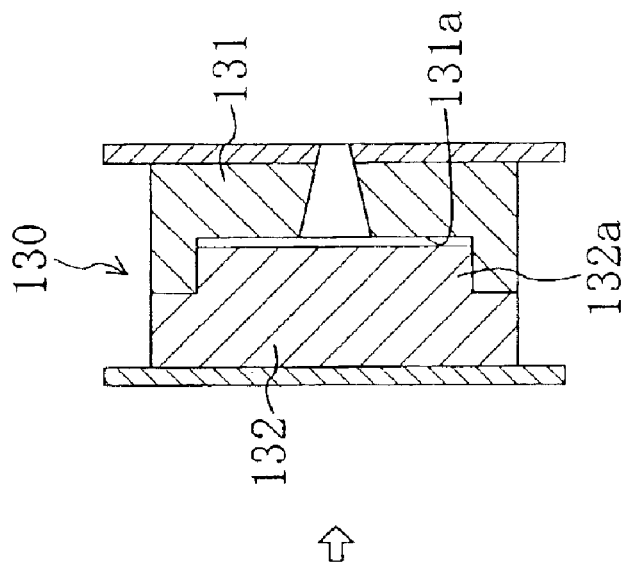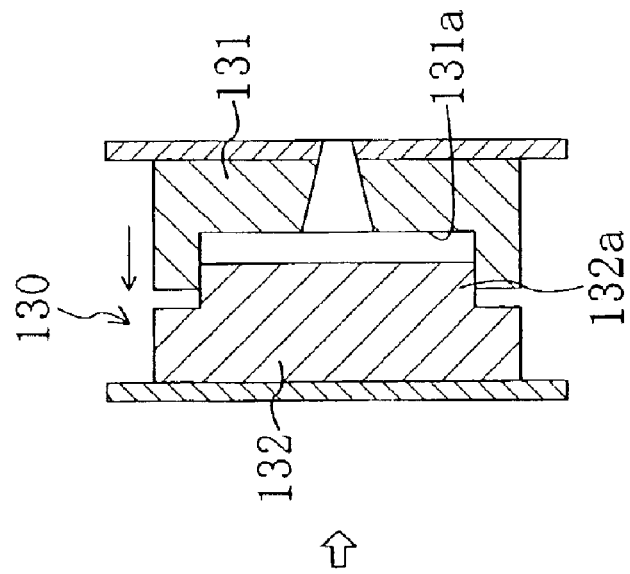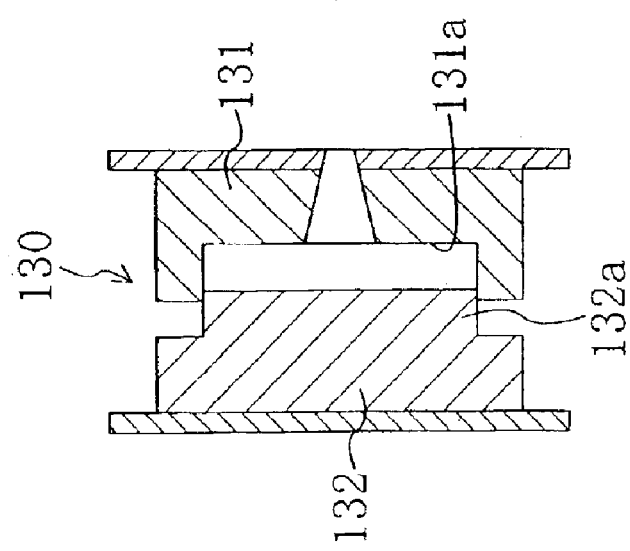

LONG GLASS FIBER FILLER REINFORCED RESIN MATERIAL FOR MOLDING, METHOD FOR MOLDING MOLDED ARTICLE, AND MOLDED ARTICLE MOLDED BY THE METHOD

BACKGROUND OF THE INVENTION

1. Field of the Invention

The present invention relates to a long glass fiber filler reinforced resin material for molding, in which a composite of a matrix resin including a polypropylene (hereinafter, referred to as "PP") component and a long glass fiber filler is formed as a masterbatch and the masterbatch is diluted with a diluent resin made from an ethylene-propylene block copolymer, a method for molding a molded article and a molded article molded by the method.

2. Discription of the Prior Art

Long glass fiber reinforced resin materials comprising a composite of about 10 mm length of a long glass fiber filler and a resin are widely used as materials for various industrial articles such as automobile parts, because of their excellent mechanical characteristics and molding processability.

As an example of such resin materials, JP 7-232324 A discloses a material obtained by the following method. A denatured PP resin having a melt flow rate (hereinafter, referred to as "MFR") of 70 to 300 g/10 min is melted, and glass fiber bundles are impregnated with the melted denatured PP resin. Thereafter, the resultant is cut to a length of 2 to 50 mm into pellets, which are masterbatch, and the masterbatch is diluted with a PP resin. This constitution is directed to improving the dispersibility of the long glass fiber filler in the masterbatch produced by a drawing method, and preventing deterioration of the strength of a molded article due to dilution of the masterbatch with a PP resin.

JP 3-25340 B discloses a blend of a long glass fiber filler reinforced pellet comprising low molecular weight thermoplastic polymer and at least 30 volume percent of glass filaments for reinforcement, and thermoplastic polymer having a higher molecular weight than that of the thermoplastic polymer contained in the pellet. This constitution is directed to improving the wettability of the resin with respect to the long glass fiber filler and improving the bending modulus of a molded article.

JP 11-152062 A discloses a front end for automobiles produced by injection-molding a raw material comprising thermoplastic resin pellets containing 20 to 80 mm mass percent of glass fibers of a full length of 2 to 100 mm arranged in parallel to each other, using a thermoplastic resin (PP, ethylene-propylene block copolymer, etc.) as the matrix. The content of the glass fibers of the front end is 15 to 50 mass percent, and the weight average fiber length is 1 to 20 mm. This publication describes that this constitution can ensure excellent vibration fatigue resistance and impact resistance and can suppress warping.

JP 2721702 B discloses a composition obtained by blending propylene polymer (propylene homopolymer or the like) and a reinforcing material (glass fibers or the like). The propylene polymer has a MFR of about 55 to 430 g/10 min, and the reinforcing material is contained in a ratio of about 20 to 65% based on the total mass of the propylene polymer and the reinforcing material. This publication describes that with this constitution, the flowing characteristics are better than those of a fiber reinforced composition made of a polymer with a low MFR, and at the same time, deterioration of the characteristics of the composition regarding the strength and the rigidity of a molded article can be prevented.

JP 6-340784 A discloses a propylene based heat resistant resin molding material comprising 3 to 97 mass % of a glass fiber bundle structure and 97 to 3% of a crystalline propylene based polymer (propylene homopolymer, ethylene-propylene copolymer, etc.) having a MFR of 50 g/10 min or more. The glass fiber bundle structure comprises 20 to 80 parts by mass of glass fibers for reinforcement substantially all of which have a length of at least 3 mm and a diameter of 20 µm or less, and 80 to 20 parts by mass of a crystalline propylene based polymer (propylene homopolymer, ethylene-propylene copolymer, etc.) that is at least partially denatured with unsaturated carboxylic acid or the derivatives thereof and has a MFR of 50 g/10 min or more in the entire polymer. In the glass fiber bundle structure, the grass fibers for reinforcement are arranged substantially in parallel to each other in the polymer component. This publication describes that with this constitution, a molded article obtained by injection molding or the like has excellent heat resistance, moldability, and anti-warping properties, and a small weight, so that the molded article can be applied to automobile parts that should have a small weight, and requires high heat resistance and molding dimensional stability. This publication also describes that the impact strength and the anti-warping properties of the molded article can be improved by adding at least one elastomer selected from ethylene based elastomers (ethylene-propylene copolymer rubber (EPM), ethylene-propylene-nonconjugated diene terpolymer rubber (EPDM), etc.) and styrene based elastomers (hydrogenated styrene-butadiene block copolymer, etc.).

JP 11-228759 A describes a propylene based resin composition comprising 90 to 30 mass percent of a propylene based resin (propylene homopolymer, ethylene-propylene block copolymer, etc.) having a MFR of 1 to 1000/10 min., a pentad isotactic index of 95% or more in the propylene homopolymer portion, and an elusion amount of 2.0 mass percent or less at 40° C. or less by chromatograph, 10 to 70 mass percent of elastomer (ethylene-propylene copolymer rubber (EPR), ethylene-propylene-diene copolymer rubber (EPDM), etc.) having a MFR of 0.1 to 100/10 min, and an inorganic filler (glass fiber or the like) in a ratio of 5 to 75 mass percent based on the total mass of the propylene based resin and the elastomer. The publication describes that with this constitution, a molded article molded by injection molding is significantly improved in the scratch resistance and the bending modulus.

WO01/72511 describes a long glass fiber filler reinforced resin material for molding comprising a matrix polymer, a long glass fiber filler and an affinity providing component for providing affinity between them, wherein at least the matrix polymer and the long glass fiber filler constitutes a composite. Herein, the matrix polymer includes a PP component having a pentad isotactic index of at least 95%, a MFR of the matrix polymer is 100 to 300 g/10 min, and the long glass fiber filler is in a content of 30 to 50 mass percent with respect to a total mass. The publication describes that with this constitution, since the MFR of the matrix polymer is at a high level properly (the molecular weight is small), breakage of the long glass fiber filler can be prevented effectively, so that a molded article having a high impact strength can be obtained. Further, it describes a long glass fiber filler reinforced resin material for molding comprising a masterbatch and a diluting polymer. Herein, the masterbatch comprises a matrix polymer including a PP component having a pentad isotactic index of at least 95%, a long glass fiber filler and an affinity providing component for providing affinity between them, wherein at least the matrix polymer and the long glass fiber filler constitutes a composite and the diluting polymer includes a PP component having a pentad isotactic index of at least 95%. Further, a MFR of the matrix polymer of the masterbatch is larger than twice a MFR of the diluting polymer, and the long glass fiber filler is in a content of 30 to 50 mass percent with respect to a total mass. The publication describes that with this constitution, the matrix polymer of the masterbatch and the diluting polymer have a large difference in the viscosity between them, and also the former has higher wettability for the long glass fiber filler than that of the latter because the former has lower viscosity than that of the latter, so that a state where the long glass fiber filler is covered with the matrix polymer can be maintained. As a result, breakage of the long glass fiber filler can be prevented effectively and a molded article having high impact strength can be obtained.

Examples of a method for molding a resin into a molded article include press forming and injection molding. When the two methods are compared, it is difficult to mold a complicated shape by press molding, whereas it is easy to mold a complicated shape by injection molding and therefore the degree of freedom of molding is high in injection molding. Further, press forming requires post-processing such as stamping for openings or the like, whereas injection molding does not require such post-processing, and therefore the processability is good in injection molding. Further, press forming requires the process of setting a resin plate (blank) to a mold, heating, and compression, whereas only injection of a molten resin into a mold is required and continuous molding can be performed in injection molding, and therefore the productivity is high in injection molding. Therefore, in view of the above points, injection molding is better than press forming.

However, when the same long glass fiber filler reinforced resin material is used for molding, the article molded by injection molding and the article molded by press forming have the same level of bending strength. However, the former has significantly lower impact strength (Izod impact value) than that of the latter. It is known that the bending strength of the molded article depends on the amount of the contained long glass fiber filler, whereas the impact strength depends on the fiber length of the contained long glass fiber filler. Accordingly, the above-described phenomenon implies that the long glass fiber filler is broken and made short in the process from the introduction of a material to the end of molding in injection molding. In fact, according to the experiment results, in press forming, when a resin material comprising a long glass fiber filler having a fiber length of a little more than 10 mm is used for molding, the length of a long glass fiber filler extracted from the molded article is about 10 mm. On the other hand, in injection molding, when the same resin material is used for molding, the length of long glass fiber filler extracted from the molded article is about 0.9 mm. As shown in FIG. 9, the long glass fiber filler 9 seems to be broken in the following manner. A solid phase 7 and a melting phase 8 of a resin are formed in a cylinder of an injection molding machine, and the long glass fiber filler 9 is bended by shearing between the resin phases at the interface between the solid phase 7 and the melting phase 8, and thus is broken. Alternatively, the long glass fiber filler 9 seems to be broken because the long glass fiber filler 9 is bended by buckling during shear flow of the resin in the melting phase 8.

The above-described problems have been tackled by improving the dispersibility and the adhesive properties of the long glass fiber filler as described in JP 7-232324 A to improve the impact strength. However, this level is not yet comparable to that of the article formed by press forming. The impact strength can be improved further by adding PP elastomer or polyethylene elastomer. However, such an approach deteriorates the bending strength.

Further, when a molded article having thin portions with a thickness of some mm is molded by injection molding or injection compression injection, it is necessary to increase a clamping force of the mold so that a pressure in mold can be higher than usual in order that the melted resin material is filled within an entire mold cavity of a mold for molding. However, such forming the molded article by increasing the pressure in mold under high clamping force may cause a problem that internal strain occurs easily in the formed molded article and deformation such as warping occurs during its releasing. Further, the following problem may exist. That is, since clamping force of the mold that is allotted to each molded article for molding is made high, the number of the molded article that can be obtained by one supply of the melted resin material decreases. As result, the productivity of the molded article may be low.

SUMMARY OF THE INVENTION

An object of the present invention is to provide a molded article having a high impact strength and a high bending strength by suppressing breakage of a long glass fiber filler in molding processing, and to provide even a molded article having thin portions by molding under a low pressure in mold.

The present invention for achieving the above-described object provides a long glass fiber filler reinforced resin material for molding comprising a masterbatch formed of a composite of a matrix resin including a PP component and a long glass fiber filler, and a diluent resin made from an ethylene-propylene block copolymer, wherein the matrix resin of the masterbatch includes the PP component having a pentad isotactic index of at least 95%, a MFR of the matrix resin of the masterbatch is 100 to 500 g/10 min and larger than six times MFR of the diluent resin, and the long glass fiber filler is in a content of 30 to 50 mass percent with respect to a total mass thereof.

According to the resin material, the MFR of the matrix resin of the masterbatch is larger than six times MFR of the diluent resin, and thus there is a large difference in the viscosity between them. Further, the viscosity of the former is lower than that of the latter, and thus the former has higher wettability with respect to the long glass fiber filler than that of the latter. Accordingly, for example, when the resin material is heated and kneaded in a cylinder of a molding machine, a state in which the glass fiber filler is covered with the matrix resin is maintained, so that breakage of the long glass fiber filler can be suppressed effectively. Also, the MFR of the matrix resin is more than 100 g/10 min and less than 500 g/10 min. Therefore, for example, the overall melt viscosity of the resin material becomes low in the cylinder of the molding machine, so that the difference in the viscosity between a solid phase and a melting phase of the matrix resin becomes small. Thus, breakage of the long glass fiber filler due to the interaction between the solid phase and the melting phase can be suppressed effectively. Further, the diluent resin is made from the ethylene-propylene block copolymer. As a result, it constitutes an island-sea structure where domains of polyethylene components are formed in the PP component, and therefore an inflicted impact can be energy-absorbed at the boundary portion between the PP component and the polyethylene component. Accordingly, a molded article having high impact strength can be obtained.

According to the resin material, the PP component of the matrix resin has the pentad isotactic index of 95% or more. In other words, most of the methyl groups of the PP component have the same configuration along the polymer chain, and therefore the PP components are arranged as closely as possible so that the crystallinity is high when solidified. Also, the ethylene-propylene block copolymer having a lower MFR than that of the matrix resin contributes to an increase of the strength of the resin component. Accordingly, a molded article having a high bending strength can be obtained.

According to the above-described resin material, the MFR of the matrix resin is larger than six times the MFR of the diluent resin, and thus there is a large difference in the viscosity between them, so that the long glass fiber filler is covered with the matrix resin in molding, and excessive dispersion can be suppressed. As a result, the long glass fiber filler is hardly exposed to the surface of the molded article. In addition, since the matrix resin has a lower viscosity and a higher flow rate than those of the diluent resin, the matrix resin flows while forming a matrix resin layer in a flow path inner wall. Therefore, when the resin material is filled in a mold cavity, the matrix resin layer is formed in the mold cavity inner wall, and a thick skin layer made of matrix resin can be formed in the molded article. Accordingly, a molded article, whose long glass fiber fillers are hardly exposed and thereby which has significantly good visual design, can be obtained.

According to the above-described resin material, the melt that is heated for melting the material has a high flowability, and a molded article having thin portions can be obtained under a low pressure in mold. As a result, the formed molded article having thin portions has less internal strain. Accordingly, it can be suppressed that deformation such as warping occurs to the molded article. Further, when the molded article is molded by injection molding, injection compression molding or the like, clamping force of the mold that is allotted to each molded article for molding can be made low, so that the number of the molded article that can be obtained by one supply of the melted resin material increases. As a result, the productivity of the molded article can be increased. In addition, since the molded article having thin portions can be obtained, reduction of consumed resin materials and thereby cost reduction and weight reduction of the molded article can be achieved.

Herein, the pentad isotactic index is an index of the tacticity of polymer. PP has a methyl group per monomer unit, so that stereoisomerism can be formed. When the configuration of the methyl groups along the polymer chain is random, the polymer is referred to as "atactic". When the configuration is alternate, the polymer is referred to as "syndiotactic". When the configuration is the same, the polymer is referred to as "isotactic". Furthermore, regarding two consecutive monomer units in PP, that is, a diad, when the configuration of these methyl groups is the same, this is referred to as "meso (m)". When the configuration is different, this is referred to as "racemi (r)". The pentad isotactic index is a ratio of the case where in arbitrary 5 consecutive monomer units, that is, a pentad, the configuration of all of the methyl groups of the pentad is the same (4 consecutive mesos are arranged (mmmm)), and is referred to also as "mmmm index". Therefore, in PP having a high pentad isotactic index, when solidified, the molecules are oriented regularly so that the crystallinity thereof becomes high. Thus, the bending strength of the molded article becomes high. The configuration of the methyl groups in a pentad can be determined by the resonance regions of the high resolution $^{13}$CNMR spectrum as to the type to which the configuration belongs, and the intensity thereof quantifies the ratio. The pentad isotactic index can be obtained by the following equation.

$$\text{Pentad isotactic index} = \frac{mmmm}{mmmm + mmmr + rmmr + mmrm + rmrr + rmrm + rrrr + mrrr + mrrm} \times 100 \quad \text{Equation 1}$$

In the resin material of the present invention, the pentad isotactic index of the PP component is 95% or more. When it is lower than 95%, a molded article having high bending strength cannot be obtained.

The MFR is an index of the melt viscosity of polymer, and the number of grams of an amount of polymer discharged per 10 min of a cylinder extrusion flow according to JIS K7210 (ASTM D1238). For the conditions of cylinder extrusion, a test temperature and a test load can be selected depending on the type of polymer. In the present invention, the MFR is measured on the condition of a test temperature of 230° C. and a test load of 21.18N. In the resin material of the present invention, the MFR of the matrix resin of the masterbatch is more than 100 g/10 min and less than 500 g/10 min. When the MFR is less than 100 g/10 min, the melt viscosity of the matrix resin becomes high, so that breakage of the long glass fiber filler cannot be suppressed, and thus a molded article having high impact strength cannot be obtained. On the other hand, when the MFR is higher than 500 g/10 min, it becomes difficult to obtain a matrix resin having a narrow molecular weight distribution in which contained molecular is uniform, so that the quality of the matrix resin varies widely. In order to obtain a effect that a molded article having a high impact strength and a high bending strength and also significantly good visual design can be obtained by molding under a low pressure in mold without a large variation of quality thereof, it is preferred that the MFR is more than 120 g/10 min and less than 300 g/10 min.

In the resin material of the present invention, the MFR of the matrix resin of the masterbatch is larger than six times MFR of the diluent resin. When it is smaller than six times, the flowability of the resin material that is low enough to mold a molded article having thin portions under a low pressure in mold cannot be obtained when heating for melting the resin material.

In the resin material of the present invention, the long glass fiber filler is contained in a ratio of 30 to 50 mass percent of the total mass. When it is lower than 30 mass percent a molded article having a high bending modulus cannot be obtained. On the other hand, when it is higher than 50 mass percent, the content of the long glass fiber filler is high, so that a molded article having high impact strength and high bending modulus may be obtained. However, the flowability of the resin material when melting is low, and therefore the function of the present invention of suppressing breakage of the long glass fiber filler by using a matrix resin having a low viscosity is not properly achieved. Thus, the durability of the molded article or the like may be poor. In particular, in the case where the resin material is forced into a mold by high pressure to mold a large-scale molded article, it is highly possible that the long glass fiber filler is broken in the molding machine or in the mold. One of the features of the present invention is that a molded article having high impact strength and high bending modulus can be realized when the content of the long glass fiber filler is in the range of 30 to 50 mass percent.

In the resin material of the present invention, the matrix resin is not limited to a particular type, but may be homo-PP, ethylene-propylene block copolymer or the like.

In the resin material of the present invention, it is preferred that the MFR of the diluent resin is more than 21.3 g/10 min and less than 44.0 g/10 min. When the MFR of the diluent resin is within this scope, a molded article molded under a low pressure having high physical properties of bending strength of 170 MPa or more and Izod impact value of 28 KJ/m$^2$ or more can be obtained. Namely, as shown in experimental samples below, when the MFR of the diluent resin is smaller than 21.3 g/10 min, high Izod impact value is not obtained. On the other hand, when the MFR of the diluent resin is larger than 44.0 g/10 min, high bending strength cannot be obtained. Herein, the Izod impact value is a value obtained by dividing the absorbed energy required to break a test specimen in the Izod impact test method according to JIS K7110 (ISO 180) by the original cross-section area of the notch portion of the test specimen, and this is an index of impact strength.

The form of the composite of the masterbatch of the resin material of the present invention is not limited to a particular form, but preferably is a 10 to 12 mm rod-shaped pellet, and preferably the long glass fiber filler is aligned in a longitudinal direction of the rod-shaped pellet. This is because this can eliminate non-uniformity in the content of the long glass fiber filler of the molded article and ensure sufficient impact strength effectively. Namely, when the length of the pellet is less than 10 mm, the long glass fiber filler contained in the molded article is short, so that sufficient impact strength cannot be obtained. On the other hand, when the length of the pellet is more than 12 mm, classification or bridge occurs in the hopper, which is an inlet through which the material is fed of the molding machine. As a result, the content of the long glass fiber filler in the molded article is not uniform. Such a rod-shaped pellet can be produced by a so-called drawing method including dipping glass fiber bundles in a bath in which the matrix resin and the like are melted to impregnate the glass fibers with the melt, solidifying the glass fibers impregnated with the melt, and cutting it in the longitudinal direction.

In the resin material of the invention, the masterbatch may comprise an affinity providing component for providing affinity between the matrix resin and the long glass fiber filler, and the affinity providing component may be acid-denatured PP having a functional group that reacts chemically with a coupling agent with which the surface of the long glass fiber filler is treated. This embodiment makes it possible that the acid-denatured portion is chemically bonded to the coupling agent on the surface of the long glass fiber filler and that the PP portion is diffused to the PP component of the matrix resin, so that strong bonding is formed between the long glass fiber filler and the matrix resin. Also, high affinity is provided between the matrix resin and the long glass fiber filler. In addition, the melt viscosity of the matrix resin is small (the molecular weight is small), and therefore the long glass fiber filler is sufficiently impregnated with the matrix resin, so that the dispersibility of the long glass fiber filler in the matrix resin is good. Herein, examples of the acid-denatured PP include PP that are denatured with maleic anhydride, acrylic acid, or carboxylic acid, and PP having a hydroxyl group as the functional group. Among these, acid-denatured PP comprising at least one selected from maleic anhydride-denatured PP and acrylic acid-denatured PP as a constituent can be used preferably.

A method for molding a molded article of the present invention comprises a heating for melting a reign component of the resin material, kneading the melt under shear flow, and molding the kneaded melt in a predetermined shape. The resin material of the present invention has a significantly advantageous function and effect in a molding method that imposes a severe hysteresis on the resin material, such as injection molding, injection compression molding, extrusion press molding and the like including the process of heating for melting the resin component in a cylinder and kneading the melt under shear flow.

In the method for molding a molded article of the present invention, the kneaded melt may be injected into a mold, thereby molding the melt in the predetermined shape under a pressure in mold of at most 14.7 MPa. Thus, clamping force of the mold that is allotted to each molded article for molding can be made low, and therefore the number of the molded article that can be obtained by one supply of the melted resin material increases. As result, the productivity of the molded article can be increased.

In the method for molding a molded article of the present invention, an initial mold clearance may be set at most 6.7 mm by injection compression molding, thereby molding the molded article having a minimum thickness of at most 2 mm. Using the resin material of the present invention and setting an initial mold clearance at most 6.7 mm by injection compression molding can provide a molded article having a minimum thickness of at most 2 mm, which could not be obtained by injection compression molding by prior art approaches. In addition, since such thin molded article can be obtained, reduction of consumed resin materials and thereby cost reduction and weight reduction of the molded article can be achieved. Also, setting the initial mold clearance at most 1 mm preferably and further preferably at most 0.7 mm can provide the molded article having a minimum thickness of at most 2 mm that is obtained with stability.

A molded article of the present invention is produced by heating for melting a reign component of a long glass fiber filler reinforced resin material for molding that comprises a composite of a matrix resin including a PP component and a long glass fiber filler and is in a content of 30 to 50 mass percent with respect to a total mass, kneading the melt under shear flow, and molding the kneaded melt in a predetermined shape. Herein, a maximum projected area of the molded article is at least 1000 cm$^2$ and a minimum thickness of the molded article is at most 2 mm. By using the resin material of the present invention, a large-scale molded article having its maximum projected area of at least 1000 cm$^2$ and its thin portions having the minimum thickness of at most 2 mm can be obtained. Such molded article could not be obtained by injection molding, injection compression molding or the like by prior art approaches.

Further, a molded article of the present invention is produced by heating for melting a reign component of the resin material of the present invention, kneading the melt under shear flow, and molding the kneaded melt in a predetermined shape, and herein bending strength of the molded article is at least 170 MPa and Izod impact value of the molded article is at least 28 KJ/m$^2$. By using the resin material of the present invention, a molded article having bending strength of at least 170 MPa and Izod impact value of at least 28 KJ/m$^2$ can be also obtained.

Examples of molded articles of the present invention include, but not limited to, a shroud module, a door module, a liftgate module, a bumper module, a step member and a structure instrument panel member for vehicles.

Other objects, features and advantages of the present invention will be clarified by the following description referring to the accompanying drawings.

BRIEF DESCRIPTION OF THE DRAWINGS

FIGS. 4A to 4C are views showing the structure of a mold for molding.

DETAILED DESCRIPTION OF THE PREFERRED EMBODIMENT

Figure 1:
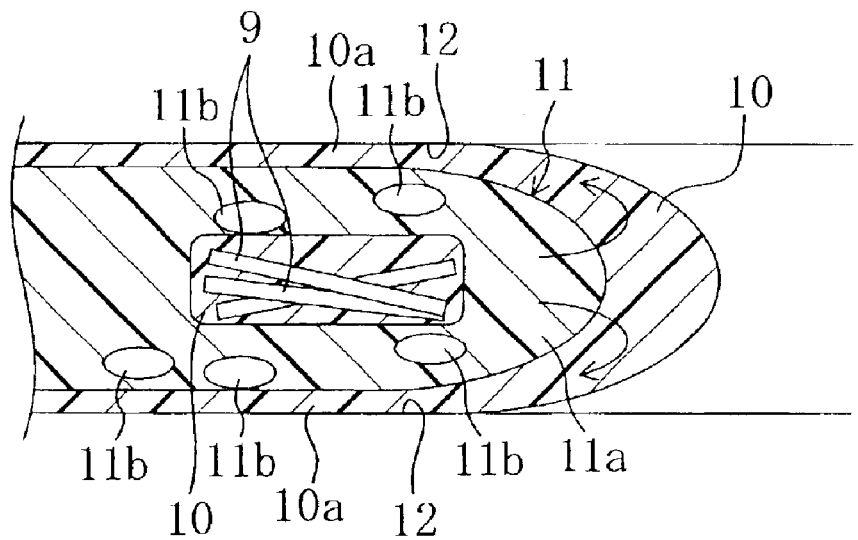
FIG. 1 is a diagram illustrating the flowing state of a resin material.

Hereinafter, preferred embodiments of the present invention will be described in detail referring to the accompanying drawings.

Long Glass Fiber Filler Reinforced PP Resin Material

A long glass fiber filler reinforced PP resin material of the preferred embodiment of the present invention is used for molding a molded article by low pressure molding including injection molding, injection compression molding or extrusion press molding. The resin material comprises a masterbatch and a diluent resin. The masterbatch is formed of a composite in pellet form comprising a matrix resin, a long glass fiber filler and an affinity providing component that provides affinity between the matrix resin and the long glass fiber filler. The diluent resin is in pellet form and made from an ethylene-propylene block copolymer.

The matrix resin is homo-PP having a pentad isotactic index of 95% or more, and a MFR of 100 to 500 g/10 min (preferably, 120 to 300 g/ 10 min), which is measured on the condition of a temperature of 230° C. and a load of 21.18N according to JIS K7210.

The long glass fiber filler is no-alkali glass such as E-glass, and the surface thereof is treated with a coupling agent such as aminosilane.

The affinity providing component is acid-denatured PP such as maleic anhydride-denatured PP or acrylic acid-denatured PP that has a functional group that reacts chemically with the coupling agent with which the surface of the long glass fiber filler is treated, and is easily diffused to homo-PP that is the matrix resin. In this case, the mixing ratio of the homo-PP and the acid-denatured PP is 5 to 95% for the former, and 95 to 5% for the latter.

The pellet of the masterbatch has a shape of a rod of 10 to 12 mm length, and the long glass fiber filler is aligned in the longitudinal direction of the rod-shaped pellet. Such a masterbatch in pellet form can be produced by a so-called drawing method including the processes of dipping glass fiber bundles in a bath which homo-PP and acid-denatured PP are melted to impregnate the glass fibers with the melt, solidifying the glass fibers impregnated with the melt, and cutting it in the longitudinal direction.

The pentad isotactic index of the PP component of the ethylene-propylene block copolymer that is the diluent resin is 95% or more, and the MFR thereof is 21.3 to 44.0 g/10 min. The diluent resin is mixed with the masterbatch, so that the content of the long glass fiber filler is 30 to 50 mass percent with respect to the total mass.

As described above, the MFR of the homo-PP that is the matrix resin of the masterbatch is 100 to 500 g/10 min (preferably, 120 to 300 g/10 min). On the hand, the MFR of the ethylene-propylene block copolymer that is the diluent resin is 21.3 to 44.0 g/10 min. The former is more than six times of the latter. Thus, there is a large difference in the viscosity between the homo-PP of the matrix resin and the ethylene-propylene block copolymer of the diluent resin, and the former has a lower viscosity than that of the latter.

Figure 2:
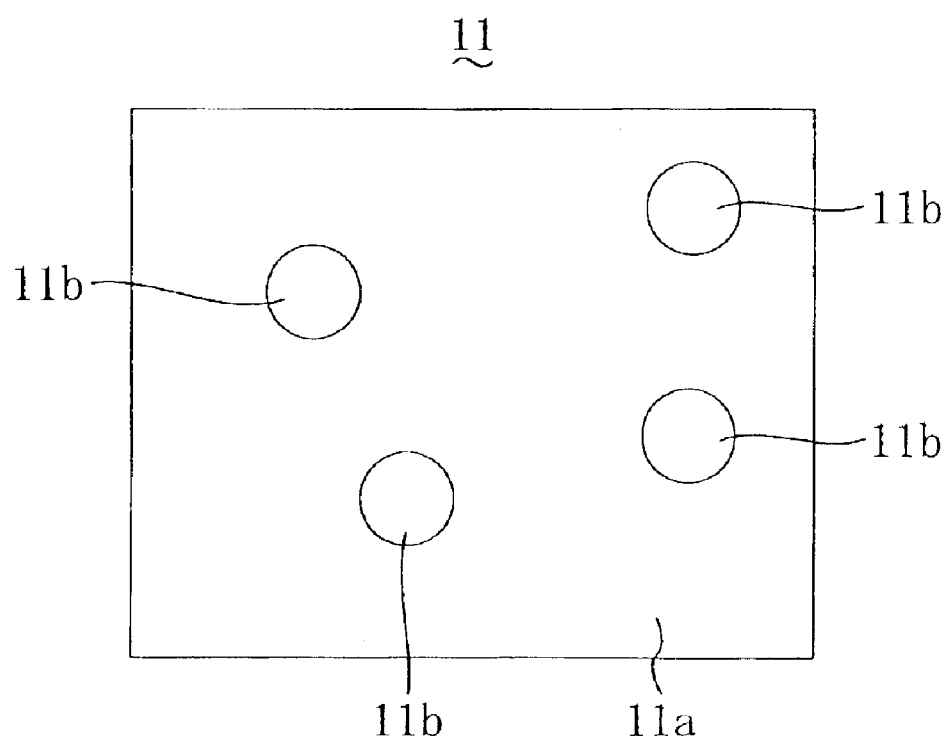
FIG. 2 is a diagram showing the constitution of an ethylene-propylene block copolymer.

The above-described resin material has the following advantages. Since the MFR of the PP of the matrix resin of the masterbatch is larger than six times the MFR of the ethylene-propylene block copolymer of the diluent resin, the former and the latter have a large difference in the viscosity between them. In addition, since the former has a lower viscosity than that of the latter, the wettability of the former with respect to the long glass fiber filler is higher. Accordingly, for example, when a resin material is heated and kneaded in the molding machine, as shown in FIG. 1, a long glass fiber filler 9 is covered with a matrix resin 10 and maintains that state, so that breakage of the long glass fiber filler can be effectively suppressed. In addition, since the MFR of the matrix resin is 100 to 500 g/10 min (preferably, 120 to 300 g/10 min), the overall melt viscosity of the resin material, for example, in the cylinder of the molding machine is low. Therefore, the viscosity difference between the solid phase and the melting phase of the matrix resin becomes small, so that breakage of the long glass fiber filler due to an interaction thereof can be suppressed effectively. Further, since the diluent resin comprises a ethylene-propylene block copolymer, the ethylene-propylene block copolymer of a diluent resin 11 constitutes an islands-sea structure where domains of polyethylene components 11b are formed in a PP component 11a, as shown-in FIG. 2. Therefore, an inflicted impact can be energy-absorbed at the boundary portion between the PP component 11a and the polyethylene component 11b. Accordingly, a molded article with high impact strength can be obtained.

In the above-described resin material, the homo-PP of the matrix resin has a pentad isotactic index of 95% or more. Namely, most of the methyl groups have the same configuration along the polymer chain. In addition, the PP component of the ethylene-propylene block copolymer of the diluent resin has a pentad isotactic index of 95% or more. As a result, PP molecules and PP components are arranged as closely to each other as possible so that the crystallinity is high when solidified. Further, since the diluent resin having a lower MFR than that of the matrix resin contributes to an increase of the strength of the resin component, a molded article having a high bending strength can be obtained.

In the above-described resin material, the MFR of the homo-PP of the matrix resin is larger than six times the MFR of the ethylene-propylene block copolymer of the diluent resin, and thus the former and the latter have a large difference in the viscosity between them. As a result, the long glass fiber filler is covered with the matrix resin, and excessive dispersion can be suppressed. In addition, as shown in FIG. 1, since the matrix resin 10 has a lower viscosity and a higher flow rate than those of the diluent resin 11, the matrix resin 10 flows while forming a matrix resin layer 10a in a flow path inner wall 12. Therefore, when the resin material is filled in a mold cavity, the matrix resin layer is formed in the mold cavity inner wall, and a thick skin layer made of the matrix resin can be formed in the molded article. Accordingly, a molded article, whose long glass fiber fillers are hardly exposed and thereby which has significantly good visual design, can be obtained.

In the above-described resin material, the melt that is heated for melting the material has high flowability, and a molded article having thin portions can be obtained under a low pressure in mold. As a result, the formed molded article having thin portions has less internal strain, and it can be suppressed that deformation such as warping occurs to the molded article. Further, when the molded article is molded by injection molding, injection compression molding or the like, clamping force of the mold that is allotted to each molded article for molding can be made low, so that the number of the molded article that can be obtained by one supply of the melted resin material increases. As a result, the productivity of the molded article can be increased.

In the above-described resin material, since the MFR of the diluent resin is 21.3 to 44.0 g/10 min, a molded article formed under a low pressure having high physical properties of bending strength of 170 MPa or more and Izod impact value of 28 KJ/m$^2$ or more can be obtained.

In the above-described resin material, the masterbatch has a rod-shaped pellet form of 10 to 12 mm length, and the long glass fiber filler is aligned in the longitudinal direction of the rod, so that the content of the long glass fiber filler in the obtained molded article is uniform, and sufficient impact strength can be obtained without fail.

Figure 3A:
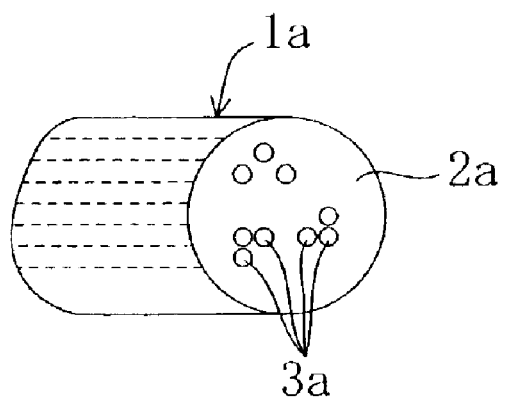
FIGS. 3A and 3B are views showing the dispersion states of long glass fibers in a matrix resin of a pellet.
Figure 3B:
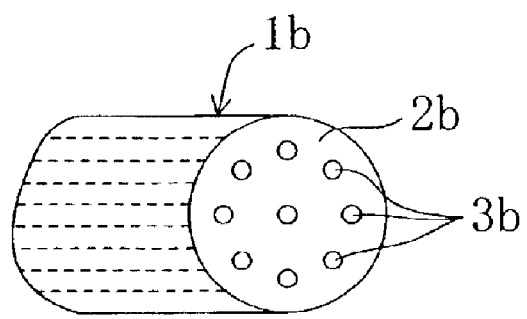

In the above-described resin material, since as the affinity providing component, acid-denatured PP such as maleic anhydride-denatured PP or acrylic acid-denatured PP is used, the acid-denatured portion is chemically bonded to the coupling agent on the surface of the long glass fiber filler and the PP portion is diffused to homo-PP of the matrix resin. As a result, strong bonding is formed between the long glass fiber filler and the matrix resin. Further, when impregnation of the long glass fiber filler with the matrix resin is not sufficient in production of the masterbatch by a drawing method, as shown in FIG. 3A, in an obtained pellet 1a, long glass fibers 3a are not sufficiently dispersed in a matrix resin 2a. However, by using the acid-denatured PP, high affinity is provided between the matrix resin and the glass fibers, and also because the melt viscosity of the matrix resin is low (the molecular weight is low), the long glass fibers are sufficiently impregnated with the matrix resin. Thus, as shown in FIG. 3B, the dispersibility of long glass fibers 3b in a matrix resin 2b of the pellet 1b is good.

Injection Compression Molding Machine and Method for Molding

A case where a molded article is molded by injection compression molding by using the above-described resin material will be described. Of course, it may be molded by injection molding, extrusion press molding or the like, and also an injection molding machine having a screw in which the shearing force is reduced, which will be described below, or an injection compression molding machine having a normal screw may be used.

In the injection compression molding machine used for molding, the pitch and the flight groove of a flight provided in a screw are larger than those of a conventional machine, so that the shearing force imposed on the long glass fiber filler can be reduced at the flight portion. Further, the path for the resin material in an anti counterflow valve is larger than that of a conventional machine. Since no splines are provided in a push plate, the shearing force imposed on the long glass fiber filler in the head portion of the injection compression molding machine can be reduced. The improved injection compression molding machine with these features prevents breakage of the long glass fiber filler of the resin material.

Further, in the injection compression molding machine, as shown in FIGS. 4A to 4C, a mold for molding 130 is made of a first mold piece 131 and a second mold piece 132 that faces to the first mold piece 131. The metal mold 130 is constituted so that the outer surface of a projection 132a of the second mold piece 132 that protrudes toward the first mold piece 131 and the inner surface of a recess 131a that is formed in the first mold piece 131 facing to the second mold piece 132 can form a closing mold cavity by their contacting together with sleeve. Further, a state of the mold cavity where the first and second mold pieces 131, 132 approach to each other closest, as shown in FIG. 4C, corresponds to the shape of a molding subject of the molded article, and a mold clearance standardizing this state, namely a predetermined distance between the first and second mold pieces 131, 132, can be maintained.

Molding of a molded article using such an injection compression molding machine can be performed in the following procedures.

First, the above-described resin material is prepared.

Then, the prepared resin material is fed into the injection compression molding machine through a hopper. Further, as shown FIG. 4A, an initial mold clearance of the mold for molding 130 is set at 6.7 mm or less (preferably, 1.0 mm or less).

Then, the resin material fed into the injection compression molding material is heated in the cylinder, so that the resin component is melted and the screw is rotated to knead the resin material.

Then, the heated and kneaded resin material is injected into the mold cavity in the mold for molding 130.

Then, as shown in FIG. 4B, the first and second mold pieces 131, 132 are made approach to a zero of the mold clearance, and then the mold 130 is clamped under a predetermined clamping force, so that the mold cavity is set to correspond to the shape of a molding subject of a molded article as shown in FIG. 4C.

Then, the injected resin material in the mold 130 is put under dwelling for a predetermined period of time. At this point, a pressure in mold for the resin pushing the metal mold 130 is 14.7 MPa or less.

Finally, the mold 130 is opened and a molded article is removed therefrom.

In the above-described method for molding a molded article, a severe hysteresis is imposed on the resin material by heating for melting a resin component of the resin material, kneading the melt under shear flow, and molding the kneaded melt in a predetermined shape. Accordingly, the functions and effects by the above-described resin material can be achieved greatly in particular, and in particular it is preferable in obtaining a large-scale molded article in plate shape having a maximum projected area of 1000 cm$^2$ or more and a minimum thickness of 2 mm or less.

In the above-described method for molding a molded article, since the pressure in mold occurred in molding is 14.7 MPa or less, clamping force that is allotted to each molded article for molding can be made low. Accordingly, the number of molded articles that can be obtained by one supply of the melted resin material increases, so that the productivity of the molded article can be increased.

In the above-described method for molding a molded article, since the initial mold clearance is set at 6.7 mm or less (preferably, 1.0 mm or less), even a molded article having a minimum thickness of 2 mm or less can be obtained. This molded article having a minimum thickness of 2 mm or less could not obtained by injection compression by prior art approaches. In addition, since a molded article having such thin portions having a minimum thickness of 2 mm or less can be obtained, reduction of consumed resin materials and thereby cost reduction and weight reduction of the molded article can be achieved.

Molded Article

Figure 5:
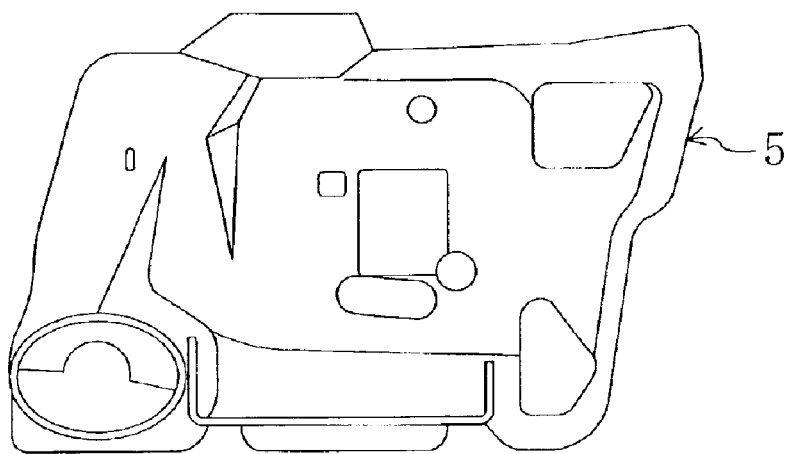
FIG. 5 is an elevation view of a door module.

FIG. 5 shows a door module 5 of as a molded article that is made of the above-described resin material by using the above-described injection compression molding machine. The door module 5 has a maximum projected area of 1000 cm$^2$ or more and a minimum thickness of 2 mm or less, and its bending strength is 170 MPa or more, and its Izod impact value is 28 KJ/m$^2$ or more. Further, its long glass fiber fillers are hardly exposed, and thus it has significantly good visual design. The door module 5 having such properties could not be obtained as a molded article by injection compression molding by prior art approaches.

Figure 6:
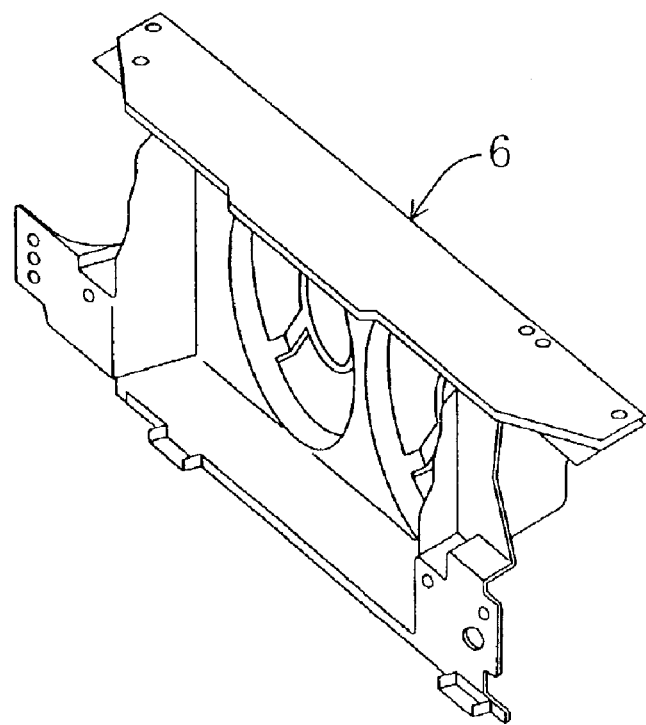
FIG. 6 is a perspective view of a shroud module.

FIG. 6 shows a shroud module 6 made of the above-described resin material by using an injection molding machine to which the same measures for suppressing breakage of long glass fiber fillers as the above-described injection compression molding machine is applied. The shroud module 6 is an integrally formed unit including a shroud upper, a shroud side member, a head lamp base, a radiator and condenser base, a cooling fan motor base, a bonnet latch base, or the like. The shroud module conventionally constituted by 23 parts can be obtained as an integral unit by injection molding, so that the number of parts, the cost or the like can be reduced. The shroud module has the same level of quality as the above-described door module.

Other Embodiments

Although in the above-described embodiments, the matrix resin of the masterbatch is homo-PP, it is not limited thereto. As long as it has PP component, it may be polyethylene-propylene block copolymer.

In the above-described embodiments, the door module and the shroud module for vehicles are molded as a molded article, but the present invention is not limited thereto. A liftgate module, a bumper module, a step member, a structure instrument panel member or the like may be molded as a molded article.

Experiment 1

Test Evaluation Samples

The resin materials of the following examples were prepared as test evaluation samples. TABLE 1 shows the constitutions of the examples.

EXAMPLE 1

Glass fiber bundles were dipped in a melt of a matrix resin including a homo-PP having a pentad isotactic index of 98% and a MFR of 24 g/10 min and acrylic acid-denatured PP. Thereafter, the glass fibers impregnated with the melt were solidified, and then were cut to an average length of 10 mm in the longitudinal direction to prepare a masterbatch in pellet form. This masterbatch was constituted by 50.1 mass percent of the homo-PP, 1.9 mass percent of the acrylic acid-denatured PP and 48 mass percent of the long glass fiber filler With respect to 100 parts by mass of the masterbatch, 20 parts by mass of an ethylene-propylene block copolymer comprising a PP component having a pentad isotactic index of 95% and having a MFR of 10 g/10 min in pellet form as a diluent resin was mixed. The thus composed resin material was denoted as Example 1 (83.3 mass percent of the masterbatch, 16.7 mass percent of the diluent resin). In Example 1, the ratio of the MFR (the matrix resin) A to the MFR (the diluent resin) B was 2.4 (A/B=2.4). The mass percentage of the long glass fiber filler with respect to the total mass was made 40% by dilution.

EXAMPLE 2

A resin material of Example 2 was prepared in the same manner as in Example 1, except that a matrix resin of the masterbatch having a MFR of 40 g/10 min was used. In Example 2, the ratio of the MFR (the matrix resin) A to the MFR (the diluent resin) B was 4.0 (A/B=4.0).

EXAMPLE 3

A resin material of Example 3 was prepared in the same manner as in Example 1, except that a matrix resin of the masterbatch having a MFR of 60 g/10 min was used. In Example 3, the ratio of the MFR (the matrix resin) A to the MFR (the diluent resin) B was 6.0 (A/B=6.0).

EXAMPLE 4

A resin material of Example 4 was prepared in the same manner as in Example 1, except that a matrix resin of the masterbatch having a MFR of 100 g/10 min was used. In Example 4, the ratio of the MFR (the matrix resin) A to the MFR (the diluent resin) B was 10.0 (A/B=10.0).

EXAMPLE 5

A resin material of Example 5 was prepared in the same manner as in Example 1, except that a matrix resin of the masterbatch having a MFR of 120 g/10 min was used. In Example 5, the ratio of the MFR (the matrix resin) A to the MFR (the diluent resin) B was 12.0 (A/B=12.0).

EXAMPLE 6

A resin material of Example 6 was prepared in the same manner as in Example 1, except that a matrix resin of the masterbatch having a MFR of 300 g/10 min was used. In Example 6, the ratio of the MFR (the matrix resin) A to the MFR (the diluent resin) B was 30.0 (A/B=30.0).

EXAMPLE 7

A resin material of Example 7 was prepared in the same manner as in Example 1, except that a matrix resin of the masterbatch having a MFR of 500 g/10 min was used. In Example 7, the ratio of the MFR (the matrix resin) A to the MFR (the diluent resin) B was 50.0 (A/B=50.0).

EXAMPLE 8

A resin material of Example 8 was prepared in the same manner as in Example 1, except that a matrix resin of the masterbatch having a MFR of 72 g/10 min and a diluent resin having a MFR of 30 g/10 min were used. In Example 8, the ratio of the MFR (the matrix resin) A to the MFR (the diluent resin) B was 2.4 (A/B=2.4).

EXAMPLE 9

A resin material of Example 9 was prepared in the same manner as in Example 8, except that a matrix resin of the masterbatch having a MFR of 120 g/10 min was used. In Example 9, the ratio of the MFR (the matrix resin) A to the MFR (the diluent resin) B was 4.0 (A/B=4.0).

EXAMPLE 10

A resin material of Example 10 was prepared in the same manner as in Example 8, except that a matrix resin of the masterbatch having a MFR of 180 g/10 min was used. In Example 10, the ratio of the MFR (the matrix resin) A to the MFR (the diluent resin) B was 6.0 (A/B=6.0).

EXAMPLE 11

A resin material of Example 11 was prepared in the same manner as in Example 8, except that a matrix resin of the masterbatch having a MFR of 300 g/10 min was used. In Example 11, the ratio of the MFR (the matrix resin) A to the MFR (the diluent resin) B was 10.0 (A/B=10.0)

EXAMPLE 12

A resin material of Example 12 was prepared in the same manner as in Example 8, except that a matrix resin of the masterbatch having a MFR of 500 g/10 min was used. In Example 12, the ratio of the MFR (the matrix resin) A to the MFR (the diluent resin) B was 16.7 (A/B=16.7).

EXAMPLE 13

A resin material of Example 13 was prepared in the same manner as in Example 1, except that a matrix resin of the masterbatch having a MFR of 120 g/10 min and a diluent resin having a MFR of 50 g/10 min were used. In Example 13, the ratio of the MFR (the matrix resin) A to the MFR (the diluent resin) B was 2.4 (A/B=2.4).

EXAMPLE 14

A resin material of Example 14 was prepared in the same manner as in Example 13, except that a matrix resin of the masterbatch having a MFR of 200 g/10 min was used. In Example 14, the ratio of the MFR (the matrix resin) A to the MFR (the diluent resin) B was 4.0 (A/B=4.0).

EXAMPLE 15

A resin material of Example 15 was prepared in the same manner as in Example 13, except that a matrix resin of the masterbatch having a MFR of 300 g/10 min was used. In Example 15, the ratio of the MFR (the matrix resin) A to the MFR (the diluent resin) B was 6.0 (A/B=6.0).

EXAMPLE 16

A resin material of Example 16 was prepared in the same manner as in Example 13, except that a matrix resin of the masterbatch having a MFR of 500 g/10 min was used. In Example 16, the ratio of the MFR (the matrix resin) A to the MFR (the diluent resin) B was 10.0 (A/B=10.0).

TABLE 1

|  | MFR (matrix resin) A g/10 min | MFR (diluent resin) B g/10 min | A/B | Izod Impact Value KJ/m$^2$ | Bending Strength MPa |
| --- | --- | --- | --- | --- | --- |
| Example 1 | 24 | 10 | 2.4 | 29.51 | 199.09 |
| Example 2 | 40 | 10 | 4.0 | 25.97 | 198.38 |
| Example 3 | 60 | 10 | 6.0 | 26.31 | 196.79 |
| Example 4 | 100 | 10 | 10.0 | 25.62 | 198.48 |
| Example 5 | 120 | 10 | 12.0 | 26.78 | 196.50 |
| Example 6 | 300 | 10 | 30.0 | 28.75 | 187.83 |
| Example 7 | 500 | 10 | 50.0 | 29.64 | 172.36 |
| Example 8 | 72 | 30 | 2.4 | 27.86 | 204.17 |
| Example 9 | 120 | 30 | 4.0 | 28.54 | 195.42 |
| Example 10 | 180 | 30 | 6.0 | 29.47 | 194.21 |
| Example 11 | 300 | 30 | 10.0 | 30.53 | 185.76 |
| Example 12 | 500 | 30 | 16.7 | 33.64 | 163.35 |
| Example 13 | 120 | 50 | 2.4 | 29.12 | 197.94 |
| Example 14 | 200 | 50 | 4.0 | 30.18 | 189.93 |
| Example 15 | 300 | 50 | 6.0 | 31.74 | 178.69 |
| Example 16 | 500 | 50 | 10.0 | 35.14 | 163.32 |

Test Evaluation Method

Bending Strength

A plate-like test specimen was injection-molded with the resin material of each example. Then, bending test was performed with these test specimens according to JIS K7171 (ISO 178), and the bending strength was measured.

Izod Impact Value

A rod-shaped body having a length of 64.0 mm and a rectangular section of 10 mm length for one side and 4 mm length for the other side was injection-molded with the resin material of each example. Then, a notch was provided with each rod-shaped body and a JIS K7110-ISO 180/1A test specimen was prepared, according to the Izod impact test method of JIS K7110 (ISO 180). In this case, the width, etc. of the notch portion of each test specimen was measured. Then, the Izod impact test was performed according to the standard of JIS with the test specimens.

Then, the absorbed energy (E) required for breaking the test specimen was calculated from the moment (WR) of the circumference of the rotary axis of a hammer, the angle of fall ($\alpha$) when the hammer is lifted, the angle ($\beta$) when the hammer rises after test specimen breakage, and the energy loss (L) at the impact test, based on the following equation:

$$E = WR(\cos \alpha - \cos \beta) - L \quad \text{Equation 2}$$

Further, the Izod impact value ($a_{kI}$) was obtained from the absorbed energy (E), the width (b) of the notch portion of the test specimen, the thickness (t) around the notch portion of the test specimen, and the depth (d) of the notch of the test specimen, based on the following equation.

$$a_{kI} = \frac{E}{b(t-d)} \times 1000 \quad \text{Equation 3}$$

Bar-Flow Test

The bar-flow test was performed with respect to each of Examples 13, 9, 15 and 11 on behalf of examples having the ratio of the MFR (the matrix resin) A to the MFR (the diluent resin) B of 2.4, 4.0, 6.0 and 10.0 (A/B=2.4, 4.0, 6.0 and 10.0).

A bar-flow mold having a width of 25 mm, a length of 1500 mm and a direct-gate diameter of 8 mm was installed to a molding machine (NISSEI PLASTIC INDUSTRIAL CO. LTD., 160t molding machine). Then, a cylinder temperature was set at 250° C. and the mold temperature was set at 60° C., and the resin material was supplied into the cylinder from the hopper and melted. The melted resin material was injected into the mold at an injection speed of 15 mm/s and then the flow length was measured. With respect to Example 13, the test evaluation was performed with respect to resin materials having a thickness of 2.0 mm, 2.2 mm and 2.5 mm under the injection pressure of 30 MPa, 60 MPa and 90 MPa, respectively. With respect to Example 9, the test evaluation was performed for resin materials having a thickness of 1.5 mm, 2.0 mm, 2.2 mm and 2.5 mm under the injection pressure of 30 MPa, 60 MPa and 90 MPa, respectively, and also the test evaluation was performed with respect to resin materials having a thickness of 4.0 mm under the injection pressure of 15 MPa, 30 MPa, 45 MPa and 60 MPa, respectively. With respect to Example 15, the test evaluation was performed for resin materials having a thickness of 1.5 mm, 2.0 mm, 2.2 mm and 2.5 mm under the injection pressure of 30 MPa, 60 MPa and 90 MPa, respectively, and also the test evaluation was performed for resin materials having a thickness of 4.0 mm under the injection pressure of 15 MPa, 30 MPa and 45 MPa, respectively. With respect to Example 11, the test evaluation was performed for resin materials having a thickness of 1.5 mm, 2.0 mm, 2.2 mm and 2.5 mm under the injection pressure of 30 MPa, 60 MPa and 90 MPa, respectively.

Test Evaluation Results

Figure 7:
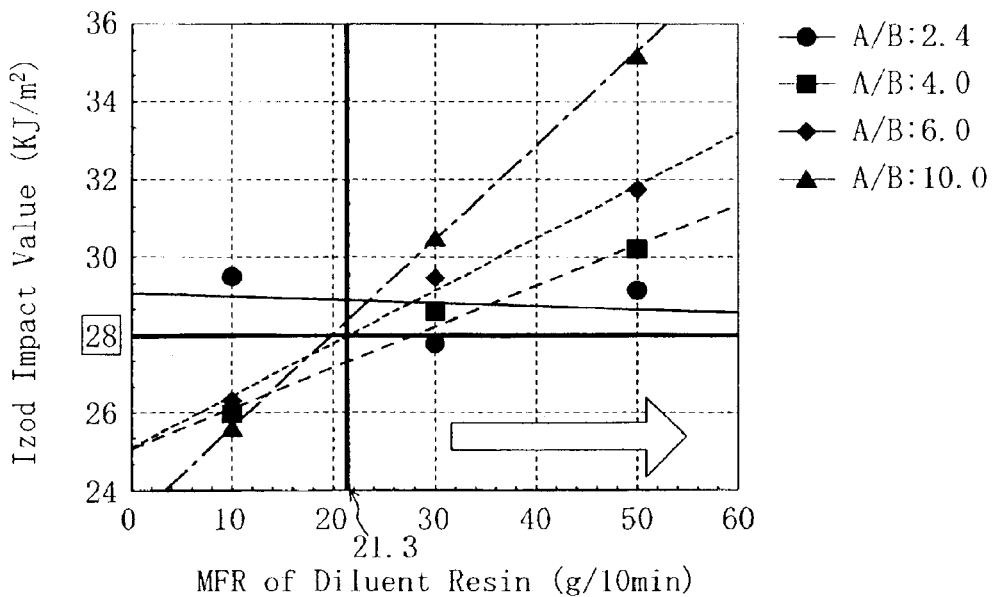
FIG. 7 is a graph showing the relationship between the MFR of a diluent resin and the Izod impact value of a molded article.
Figure 8:
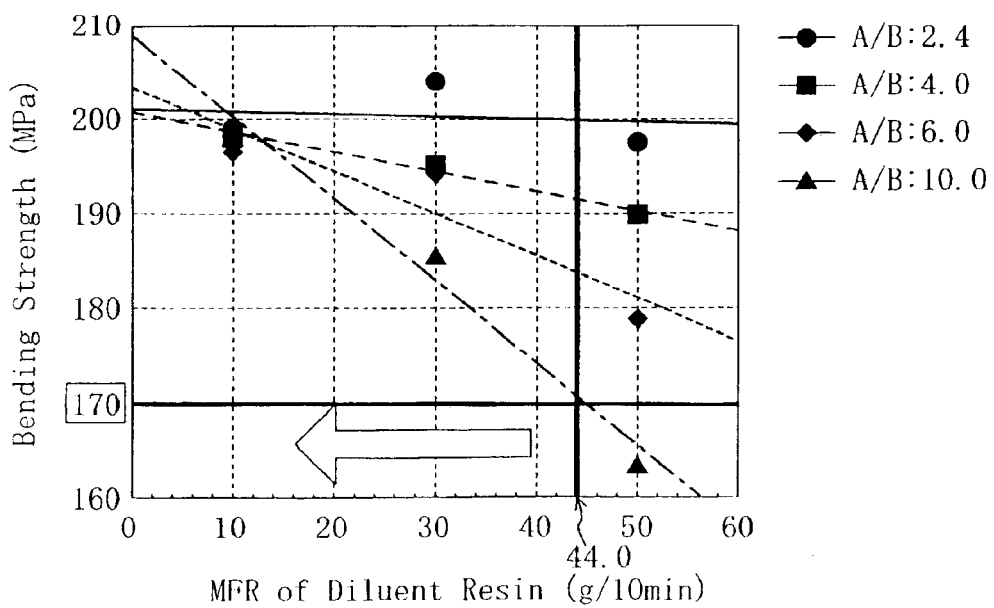
FIG. 8 is a graph showing the relationship between the MFR of the diluent resin and the bending strength of the molded article.
Figure 9A:
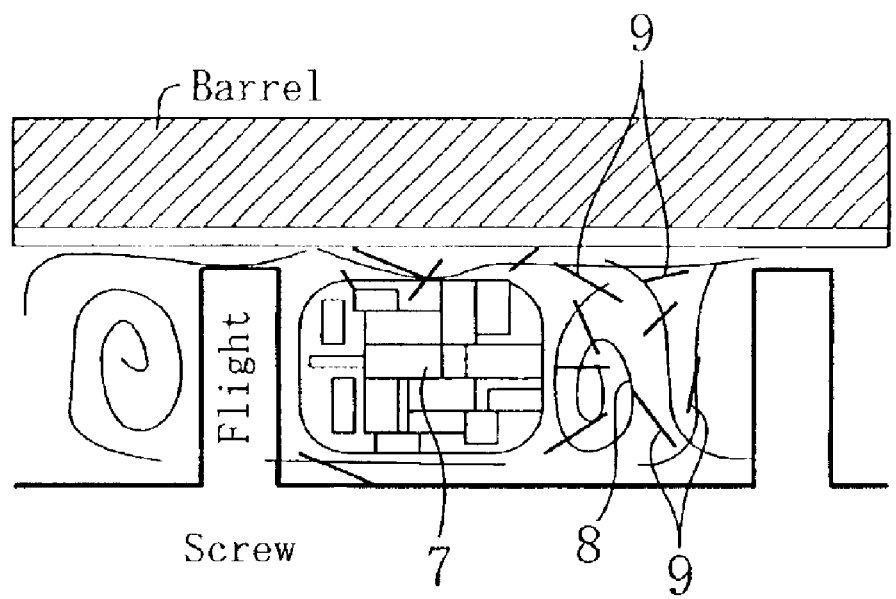
FIGS. 9A and 9B are diagrams showing the states of the matrix resin and the long glass fiber filler in an injection molding machine.
Figure 9B:
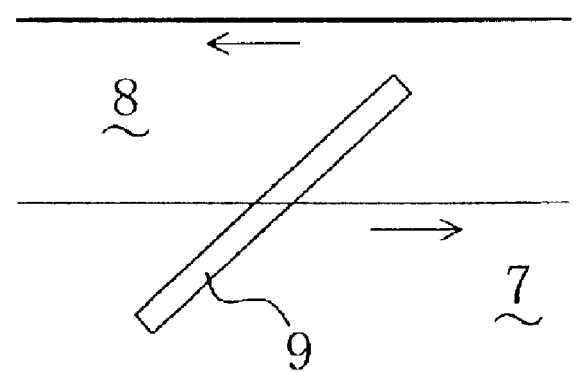

TABLE 1 shows test evaluation results of the Izod impact value and the bending strength. Further, TABLE 2 and FIG. 7 show the relationship of the MFR and the Izod impact value of the diluent resin for each MFR (the matrix resin) A/MFR (the diluent resin) B from the test results. In addition, TABLE 3 and FIG. 8 show the relationship of the MFR and the bending strength of the diluent resin for each MFR (the matrix resin) A/MFR (the diluent resin) B from the test results.

TABLE 2

| Izod Impact Value KJ/m² | | MFR of Diluent polymer g/10 min | | |
|---|---|---|---|---|
| | | 10 | 30 | 50 |
| MFR Ratio | 10.0 | 25.62 | 30.53 | 35.14 |
| | 6.0 | 26.31 | 29.47 | 31.74 |
| | 4.0 | 25.97 | 28.54 | 30.18 |
| | 2.4 | 29.51 | 27.86 | 29.12 |

TABLE 3

| Bending Strength MPa | | MFR of Diluent polymer g/10 min | | |
|---|---|---|---|---|
| | | 10 | 30 | 50 |
| MFR Ratio | 10.0 | 198.48 | 185.76 | 163.32 |
| | 6.0 | 196.79 | 194.21 | 178.69 |
| | 4.0 | 198.38 | 195.42 | 189.93 |
| | 2.4 | 199.09 | 204.17 | 197.94 |

According to TABLE 1, although the Izod impact value of Example 1 was higher than that of Examples 2 to 6, it can be realized that as long as the diluent resin has the same MFR, the higher the MFR of the matrix resin is, the larger the Izod impact value is, as a whole. The reason for this seems to be that the lower the melt viscosity of the matrix resin is, the larger the effect of suppressing breakage of the long glass fiber filler of the matrix resin by coating it is. Likewise, it can be realized that as long as the matrix resin has the same MFR, the higher the MFR of the diluent resin is, the larger the Izod impact value of the diluent resin is. The reason for this seems to be that the lower the melt viscosity of the diluent resin is, the lower the melt viscosity of the resin material is as a whole, so that the difference in the viscosity between the solid phase and the melting phase in molding becomes small and thereby the effect of suppressing breakage of the long glass fiber filler by their interaction increases.

Further, although it was not clear in Examples 1 to 7 having the MFR of the diluent resin of 10 g/10 min, it can be realized that as long as the diluent resin has the same MFR, the higher the MFR of the matrix resin is, the smaller the bending strength is, as a whole. The reason for this seems to be that the lower the molecular weight of the matrix resin is, the more the brittleness of the matrix resin reflects on the bending strength. Likewise, as long as the matrix resin has the same MFR, it can be realized that the higher the MFR of the diluent resin is, the lower the bending strength is. The reason for this seems to be that the lower the molecular weight of the diluent resin is, the more the brittleness of the diluent resin reflects on the bending strength, too.

According to TABLE 2 and FIG. 7, it can be realized that the larger the ratio of MFR (the matrix resin) A to MFR (the diluent resin) B is, the larger the effect of improving the Izod impact value by increasing the MFR of the diluent resin is. Accordingly, it can be presumed that the larger the difference of the viscosity between the matrix resin and the diluent resin is, the larger the effect of suppressing breakage of the long glass fiber filler of the matrix resin by coating it is. Further, when the ratio of MFR (the matrix resin) A to MFR (the diluent resin) B is 6.0 or more, in order to obtain the Izod impact value of 28 KJ/m2 or more, at least the diluent resin having the MFR of 21.3 g/10 min or more may be used.

According to TABLE 3 and FIG. 8, it can be realized that the larger the ratio of MFR (the matrix resin) A to MFR (the diluent resin) B is, the larger the decrease of the bending strength by increasing the MFR of the diluent resin is. Accordingly, it can be presumed that the larger the difference of the molecular weight between the matrix resin and the diluent resin is, the larger the influence of the brittleness of the matrix resin having small molecular weight is. Further, when the ratio of MFR (the matrix resin) A to MFR (the diluent resin) B is 10.0 or less, in order to obtain the bending strength of 170 MPa or more, at least the diluent resin having the MFR of 44.0 g/10 min or less may be used.

TABLE 4 shows results of the bar-flow test.

TABLE 4

| Thick- ness mm | Injection Pressure MPa | A/B | | | |
|---|---|---|---|---|---|
| | | 2.4 Example 13 | 4.0 Example 9 | 6.0 Example 15 | 10.0 Example 11 |
| 1.5 | 30 | — | 202 | 271 | 254 |
| | 60 | — | 350 | 421 | 423 |
| | 90 | — | 448 | 575 | 539 |
| 2.0 | 30 | 333 | 299 | 403 | 366 |
| | 60 | 551 | 511 | 637 | 605 |
| | 90 | 735 | 680 | 820 | 777 |
| 2.2 | 30 | 380 | 357 | 456 | 413 |
| | 60 | 633 | 598 | 729 | 678 |
| | 90 | 840 | 787 | 959 | 891 |
| 2.5 | 30 | 443 | 418 | 520 | 473 |
| | 60 | 737 | 687 | 850 | 836 |
| | 90 | 965 | 910 | 1103 | 1032 |
| 4.0 | 15 | — | 410 | 537 | — |
| | 30 | — | 722 | 921 | — |
| | 45 | — | 994 | 1220 | — |
| | 60 | — | 1235 | — | — |

Flow length mm

According to TABLE 4, when Example 13 having the ratio of MFR (the matrix resin) A to MFR (the diluent resin) B of 2.4 and Example 9 having the ratio of MFR (the matrix resin) A to MFR (the diluent resin) B of 4.0 are compared, it can be realized that the former has higher flowability than that of the latter. The reason for this seems to be that although there are differences of the viscosity between the matrix resin and the diluent resin thereof, influence of flowability of the diluent resin is large. When Examples 9, 15 and 11 having the ratio of MFR (the matrix resin) A to MFR (the diluent resin) B of 4.0 to 10.0 are compared, it can be realized that the larger the differences of the viscosity between the matrix resin and the diluent resin are, the higher the flowability is. The reason for this seems to be that there are large differences of viscosity between the matrix resin and the diluent resin thereof and influence of flowability of the matrix resin having low viscosity is large. Herein, in comparing Example 15 with Example 11, Example 15 has larger values of the flow length. This seems to be influenced by the diluent resin of Example 15 having the MFR that is 50 g/10 min and high.

Experiment 2

Test Evaluation Samples

The resin materials of Example 9 (MFR (the matrix resin) A/MFR (the diluent resin) B=4.0: low flowability) and Example 11 (MFR (the matrix resin) A/MFR (the diluent resin) B=10.0: high flowability) of Experiment 1 were prepared as test evaluation samples.

Test Evaluation Method

Trials of injection compression molding of a thin plate-like molded article were performed at plural times respectively under each of the following conditions. At this point, the pressure in mold was measured, and the molding state of the formed molded article was observed (an existence of underfill), and also the thickness of a portion having the minimum thickness was measured. TABLE 5 shows conditions of injection compression molding for each trial.

Condition A: Trials 1 to 30

The resin material of Example 9 was used. The following conditions of the injection compression molding were set: the clamping force of 4.90 MN; the piston moving distance of 130 mm; the mold clearance of 6.7 mm; the injection pressure setting of 80%; and the cylinder temperature of 240° C. Herein, the piston moving distance concerns an amount of the resin material injected that is obtained by its being multiplied by the sectional area of the cylinder, and therefore it should be a factor for setting the amount of the resin material injected. Further, the injection pressure setting was a percentage to the maximum injection pressure of 140 MPa, and it was for setting the injection pressure of the resin material. Further, the cylinder temperature was for setting the temperature of the resin material.

Condition B: Trials 31 to 35

The resin material of Example 9 was used. The following conditions of the injection compression molding were set: the clamping force of 4.90 MN; the piston moving distance of 120 mm; the mold clearance of 6.7 mm; the injection pressure setting of 80%; and the cylinder temperature of 240° C.

Condition C: Trials 36 to 65

The resin material of Example 11 was used. The following conditions of the injection compression molding were set: the clamping force of 4.90 MN; the piston moving distance of 120 mm; the mold clearance of 6.7 mm; the injection pressure setting of 80%; and the cylinder temperature of 240° C.

Condition D: Trials 66 to 67

The resin material of Example 11 was used. The following conditions of the injection compression molding were set: the clamping force of 2.94 MN; the piston moving distance of 120 mm; the mold clearance of 6.7 mm; the injection pressure setting of 80%; and the cylinder temperature of 240° C.

Condition E: Trials 68 to 70

The resin material of Example 11 was used. The following conditions of the injection compression molding were set: the clamping force of 2.94 MN; the piston moving distance of 120 mm; the mold clearance of 4.3 mm; the injection pressure setting of 80%; and the cylinder temperature of 240° C.

Condition F: Trials 71 to 73

The resin material of Example 11 was used. The following conditions of the injection compression molding were set: the clamping force of 2.94 MN; the piston moving distance of 120 mm; the mold clearance of 4.3 mm; the injection pressure setting of 99%; and the cylinder temperature of 240° C.

Condition G: Trials 74 to 75

The resin material of Example 11 was used. The following conditions of the injection compression molding were set: the clamping force of 2.94 MN; the piston moving distance of 120 mm; the mold clearance of 0.6 mm; the injection pressure setting of 99%; and the cylinder temperature of 250° C.

Condition H: Trials 76 to 85

The resin material of Example 11 was used. The following conditions of the injection compression molding were set: the clamping force of 2.45 MN; the piston moving distance of 120 mm; the mold clearance of 0.6 mm; the injection pressure setting of 99%; and the cylinder temperature of 250° C.

TABLE 5

| Condition | Trial Number | Resin Material | Clamping Force MN | Piston Moving Distance Mm | Mold Clearance mm | Injection Pressure Setting % | Cylinder Temperature ° C. |
|---|---|---|---|---|---|---|---|
| A | 1–30 | Example 9 | 4.90 | 130 | 6.7 | 80 | 240 |
| B | 31–35 | Example 9 | 4.90 | 120 | 6.7 | 80 | 240 |
| C | 36–65 | Example 11 | 4.90 | 120 | 6.7 | 80 | 240 |
| D | 66–67 | Example 11 | 2.94 | 120 | 6.7 | 80 | 240 |
| E | 68–70 | Example 11 | 2.94 | 120 | 4.3 | 80 | 240 |
| F | 71–73 | Example 11 | 2.94 | 120 | 4.3 | 99 | 240 |
| G | 74–75 | Example 11 | 2.94 | 120 | 0.6 | 99 | 250 |
| H | 76–85 | Example 11 | 2.45 | 120 | 0.6 | 99 | 250 |

Test Evaluation Results

Test results under each of the conditions will be described below and the abstracts are shown in TABLE 6.

Condition A: Trials 1 to 30

No underfill of the molded article occurred in all trials. An average of the pressure in mold occurred in molding was 24.6 MPa. An average of the minimum thickness of the molded article was 2.07 mm.

Condition B: Trials 31 to 35

In five trials, no underfill of the molded article occurred in two trials, whereas underfill of the molded article occurred in three trials. In the case where no underfill occurred, an average of the pressure in mold occurred in molding was 23.7 MPa. The minimum thickness of the molded article was not measured.

Condition C: Trials 36 to 65

No underfill of the molded article occurred in all trials. An average of the pressure in mold occurred in molding was 22.2 MPa. An average of the minimum thickness of the molded article was 1.82 mm.

Condition D: Trials 66 to 67

Underfill of the molded article occurred in all of two trials. The pressure in mold and the minimum thickness of the molded article were not measured.

Condition E: Trials 68 to 70

In three trials, no underfill of the molded article occurred in one trial, whereas underfill of the molded article occurred in two trials. The pressure in mold and the minimum thickness of the molded article were not measured.

Condition F: Trials 71 to 73

In three trials, no underfill of the molded article occurred in one trial, whereas underfill of the molded article occurred in two trials. The pressure in mold and the minimum thickness of the molded article were not measured.

Condition G: Trials 74 to 75

No underfill of the molded article occurred in all trials. An average of the pressure in mold occurred in molding was 15.5 MPa. An average of the minimum thickness of the molded article was 1.82 mm.

Condition H: Trials 76 to 85

No underfill of the molded article occurred in all trials. An average of the pressure in mold occurred in molding was 14.3 MPa. An average of the minimum thickness of the molded article was 1.82 mm.

TABLE 6

| Condition | Trial Number | Existence of underfill | Pressure in Mold MPa | Minimum Thickness mm |
|---|---|---|---|---|
| A | 1–30 | No underfill in all trials | 24.6 | 2.07 |
| B | 31–35 | No underfill in two trials, underfill in the three trials | 23.7 | — |
| C | 36–65 | No underfill in all trials | 22.2 | 1.82 |
| D | 66–67 | No underfill in all trials | — | — |
| E | 68–70 | No underfill in one trial, underfill in two trials | — | — |
| F | 71–73 | No underfill in two trials, underfill in one trial | — | — |
| G | 74–75 | No underfill in all trials | 15.5 | 1.82 |
| H | 76–85 | No underfill in all trials | 14.3 | 1.82 |

According to the above results, although Condition A and Condition B were different from one another only in the condition of the amount of the resin material injected, no underfill of the molded article occurred in all trials in the former, whereas underfill of the molded article occurred in three trials among the five trials in the latter. The reason for this seems to be that enough amount of the resin material was not supplied to fill the resin material within the entire mold cavity of the mold in Condition B.

Condition B and Condition C were different from one another in the kind of the resin material, namely Condition B was Example 9 having low flowability, whereas Condition C was Example 11 having high flowability. Herein, unserfill of the molded article occurred in some trails in the former, whereas no underfill of the molded article occurred in all trails in the latter. The reason for this seems to be that the resin material of Example 11 had high flowability and therefore the resin material was filled within the entire mold cavity of the mold even if such amount of the resin material causes underfill of the molded article in Example 9. Further, the molded article formed under Condition C had a minimum thickness of 2 mm or less, and this is a molded article that cold never be obtained conventionally by the resin material of Example 9 under Condition A.

Although Condition C and Condition D were different from one another only in the condition of the clamping force, no underfill of the molded article occurred in all trials in the former, whereas underfill of the molded article occurred in all trials in the latter. The reason of this seems to be that the flowability of the resin material by clamping became low under Condtion D where the clamping force was low.

Although Condition D and Condition E were different from one another only in the condition of the mold clearance, underfill of the molded article occurred in all trials in the former, whereas underfill of the molded article occurred in two trials among the three trials in the latter. This seems to mean that a molded article with no underfill could be obtained by narrowing the mold clearance and thereby by increasing the flowability of the resin material even if the clamping force was low.

Although Condition E and Condition F were different from one another only in the condition of the injection pressure, underfill of the molded article occurred in two trials among the three trials in the former, whereas underfill of the molded article occurred in one trial among the three trials in the latter. The reason for this seems to be that the resin material could be filled more within the entire mold cavity of the mold under Condition F where the injection pressure was high, compared to Condition E where the injection pressure was low.

Although Condition F and Condition G were different from one another in the conditions of the mold clearance and the temperature of the resin material, underfill of the molded article occurred in one trial among the three trials in the former, whereas no underfill of the molded article occurred in all trials in the latter. The reason for this seems to be that the resin material could be filled more within the entire mold cavity of the mold under Condition G due to the effect of narrowing the mold clearance, which was described above in the comparison of Condition D and Condition E, and the higher flowability than that of Condition F by the high temperature of the resin material. Further, in Condition G, the mold clearance was narrower, the injection pressure was higher and the temperature of the resin material was higher than those in Condition C, and thereby the flowability of the resin material was high. Therefore, the pressure in mold in Condition G was considerably lower than that in Condition C. If the pressure in mold can be lowered like this, even if a molded article has thin portions, the formed molded article having thin portions has less internal strain and thus occurrence of deformation of the molded article such as warping can be prevented.

Although Condition G and Condition H were different from one another only in the condition of the clamping force, no underfill of the molded article occurred in all trials under both conditions. In the comparison between Condition C and Condition D, the results was that underfill of the molded article occurred easily by lowering the clamping force. However, this can indicate that such a problem can be resolved by increasing the flowability of the molded article, such as by narrowing the mold clearance, increasing the injection pressure and increasing the temperature of the resin material. Further, although the pressure in mold decreased to 14.7 MPa or less by lowering the clamping force, the above-described effect of lowering the pressure in mold can be obtained more effectively due to this. Further, a clamping force of the mold that is allotted to each molded article for molding can be made low by lowering the clamping force, so that the number of the molded article that can be obtained by one supply of the melted resin material increases. As a result, the productivity of the molded article can be increased. Specifically, in the case of Condition A, one molded article was formed under the clamping force of 4.90 MN by the resin material of Example 9, and in the case of Condition H, one molded article was formed under the clamping force of 2.45 MN by the resin material of Example 11. Namely, the clamping force of the latter is a half of that of the former. Accordingly, when conditions except the clamping force are the same as those of Condition H, two molded articles can be obtained under 4.90 MN by the resin material of Example 11.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A long glass fiber filler reinforced resin material for molding comprising:

a masterbatch formed of a composite of a matrix resin of homopolypropylene having a pentad isotactic index of at least 95% and a long glass fiber filler, and including an affinity providing component for providing affinity between said matrix resin and said long glass fiber filler; and a diluent resin of an ethylene-propylene block copolymer including a polypropylene component having a pentad isotactic index of at least 95%, an islands-sea structure where domains of polyethylene components are formed in the polypropylene component, and a melt flow rate of 21.3 to 44.0 g/10 min, which is measured on the condition of a temperature of 230° C. and a load of 21.18N according to JIS K7210, wherein said matrix resin of the masterbatch has a melt flow rate of 120 to 300 g/10 min, which is measured on the same condition as the melt flow rate of the diluent resin and is larger than six times the melt flow rate of the diluent resin, said long glass fiber filler, of which the surface is treated with a coupling agent, is in a content of 30 to 50 mass percent with respect to a total mass thereof, and said affinity providing component is acid-denatured polypropylene having a functional group that reacts chemically with said coupling agent, and including at least one selected from the group consisting of maleic anhydride-denatured polypropylene and acrylic acid-denatured polypropylene as a constituent.

2. The long glass fiber filler reinforced resin material for molding of claim 1, wherein said composite of the masterbatch has a form of a 10 to 12 mm rod-shaped pellet, and said long glass fiber filler is aligned in a longitudinal direction of the rod-shaped pellet.

3. A method for molding a molded article comprising:

a long glass fiber filler reinforced resin material for molding, the long glass fiber filler reinforced resin material comprising a masterbatch formed of a composite of a matrix resin of homopolypropylene having a pentad isotactic index of at least 95% and a long glass fiber filler, and including an affinity providing component for providing affinity between said matrix resin and said long glass fiber filler, and a diluent resin of an ethylene-propylene block copolymer including a polypropylene component having a pentad isotactic index of at least 95%, an islands-sea structure where domains of polyethylene components are formed in the polypropylene component, and a melt flow rate of 21.3 to 44.0 g/10 min, which is measured on the condition of a temperature of 230° C. and a load of 21.18N according to JIS K7210, wherein said matrix resin of the masterbatch has a melt flow rate of 120 to 300 g/10 min, which is measured on the same condition as the melt flow rate of the diluent resin and is larger than six times the melt flow rate of the diluent resin, and said long glass fiber filler, of which the surface is treated with a coupling agent, is in a content of 30 to 50 mass percent with respect to a total mass, and said affinity providing component is acid-denatured polypropylene having a functional group that reacts chemically with said coupling agent, and including at least one selected from the group consisting of maleic anhydride-denatured polypropylene and acrylic acid-denatured polypropylene as a constituent;

heating said reinforced resin material kneading said melt under shear flow; and molding said kneaded melt in a predetermined shape.

4. The method for molding a molded article of claim 3, wherein said kneaded melt is injected into a mold, thereby molding the melt in said predetermined shape under a pressure in mold of at most 14.7 MPa.

5. The method for molding a molded article of claim 3, wherein an initial mold clearance is set at most 6.7 mm by injection compression molding, thereby molding the molded article having a minimum thickness of at most 2 mm.

* * * * *